United States Patent
Subrahmanya et al.

(10) Patent No.: US 7,430,191 B2
(45) Date of Patent: Sep. 30, 2008

(54) METHOD AND APPARATUS FOR PERFORMING FREQUENCY TRACKING BASED ON DIVERSITY TRANSMITTED PILOTS IN A CDMA COMMUNICATION SYSTEM

(75) Inventors: Parvathanathan Subrahmanya, Sunnyvale, CA (US); Andrew Sendonaris, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 09/950,744

(22) Filed: Sep. 10, 2001

(65) Prior Publication Data

US 2003/0128678 A1    Jul. 10, 2003

(51) Int. Cl.
*H04B 7/216* (2006.01)

(52) U.S. Cl. .................. 370/335; 370/342; 370/441; 375/147; 375/148

(58) Field of Classification Search .......... 370/335, 370/342; 374/147, 148
See application file for complete search history.

(56) References Cited

U.S. PATENT DOCUMENTS

| | | | | | |
|---|---|---|---|---|---|
| 4,644,526 | A * | 2/1987 | Wu | ............. | 370/295 |
| 5,640,431 | A | 6/1997 | Bruckert et al. | | |
| 5,764,687 | A * | 6/1998 | Easton | ............. | 375/147 |
| 5,812,615 | A * | 9/1998 | Baum et al. | ............. | 375/344 |
| 5,943,329 | A * | 8/1999 | Ohgoshi et al. | ............. | 370/335 |
| 6,363,102 | B1 * | 3/2002 | Ling et al. | ............. | 375/147 |
| 6,373,861 | B1 * | 4/2002 | Lee | ............. | 370/503 |
| 6,456,609 | B2 * | 9/2002 | Ohgoshi et al. | ............. | 370/335 |
| 6,671,334 | B1 * | 12/2003 | Kuntz et al. | ............. | 375/340 |
| 6,791,964 | B1 * | 9/2004 | Hwang et al. | ............. | 370/342 |
| 6,891,883 | B2 * | 5/2005 | Sourour et al. | ............. | 375/148 |
| 6,940,875 | B2 * | 9/2005 | Mesecher et al. | ............. | 370/516 |
| 2002/0003788 | A1 * | 1/2002 | Ohgoshi et al. | ............. | 370/335 |
| 2002/0009064 | A1 * | 1/2002 | Blessent et al. | ............. | 370/335 |
| 2002/0181391 | A1 * | 12/2002 | Wang | ............. | 370/210 |
| 2002/0196768 | A1 * | 12/2002 | Ohgoshi et al. | ............. | 370/342 |
| 2003/0021247 | A1 * | 1/2003 | Sendonaris | ............. | 370/335 |
| 2003/0128678 | A1 * | 7/2003 | Subrahmanya et al. | ............. | 370/335 |
| 2004/0032842 | A1 * | 2/2004 | Mesecher et al. | ............. | 370/335 |
| 2004/0163120 | A1 * | 8/2004 | Rabenko et al. | ............. | 725/111 |
| 2004/0252678 | A1 * | 12/2004 | Rabenko et al. | ............. | 370/352 |
| 2005/0013350 | A1 * | 1/2005 | Coralli et al. | ............. | 375/148 |

FOREIGN PATENT DOCUMENTS

| | | |
|---|---|---|
| WO | 0065797 | 11/2000 |
| WO | 0154287 A2 | 7/2001 |

* cited by examiner

*Primary Examiner*—Chirag G. Shah
(74) *Attorney, Agent, or Firm*—David J. Huffaker; Kenneth D. Baker; Thomas R. Rouse

(57) ABSTRACT

Techniques to acquire and track a received signal instance (or multipath) based on one or more transmitted pilots. In an aspect, a frequency tracking loop is provided to acquire and track the multipath, and supports a number of loop modes (e.g., acquisition and tracking modes). Each loop mode may be associated with a respective frequency detector and a set of values for a set of elements in the loop. In another aspect, several frequency detectors are provided for deriving estimates of the frequency error in the downconversion of the multipath (e.g., from radio frequency to baseband). In one design, maximum likelihood estimates of the frequency error are derived based on the recovered pilot symbols. In another design, the frequency error estimates for the multipath are derived based on the frequency error estimated for each transmitted signal.

30 Claims, 8 Drawing Sheets

METHOD AND APPARATUS FOR PERFORMING FREQUENCY TRACKING BASED ON DIVERSITY TRANSMITTED PILOTS IN A CDMA COMMUNICATION SYSTEM

BACKGROUND

1. Field

The present invention relates generally to data communication, and more particularly to techniques for performing frequency tracking of a received signal instance based on diversity transmitted pilots in a wireless (e.g., CDMA) communication system.

2. Background

Wireless communication systems are widely deployed to provide various types of communication including voice and packet data services. These systems may be based on code division multiple access (CDMA), time division multiple access (TDMA), or some other multiple access technique. CDMA systems may provide certain advantages over other types of system, including increased system capacity. A CDMA system is typically designed to conform to one or more standards, such as IS-95, cdma2000, and W-CDMA standards, all of which are known in the art and incorporated herein by reference.

In a CDMA system, a pilot is often transmitted from a transmitter unit (e.g., a base station) to a receiver unit (e.g., a terminal) to assist the receiver unit perform a number of functions. The pilot may be used at the receiver unit for synchronization with the timing and frequency of the transmitter unit, estimation of the quality of the communication channel, coherent demodulation of a data transmission, and possibly other functions. The pilot is typically generated based on a known symbol pattern (e.g., a sequence of all A-valued symbols) and using a known signal processing scheme (e.g., channelize with a particular channelization code and scrambled with a known scrambling sequence).

The W-CDMA standard supports downlink data transmission from a base station via one or two antennas. Transmit diversity (i.e., data transmission via two antennas) may be used to combat deleterious path effects such as fading and multipath. In a "space time block coding transmit antenna diversity" (STTD) mode supported by the W-CDMA standard, two pilots generated based on two different pilot symbol patterns may be transmitted from two base station antennas.

At the terminal, a rake receiver is often used to recover the transmitted pilot and other traffics. The signal transmitted from each base station antenna may be received via multiple signal paths at the terminal, and each signal instance (or multipath) in the received signal of sufficient strength may be assigned to, and processed by, a respective finger processor of the rake receiver. If transmit diversity is used at the base station, each assigned multipath includes a signal component for each transmitted signal, with each signal component having an amplitude and phase determined by, and indicative of, the channel response between the base station antenna and the terminal for the multipath. Each finger processor processes the assigned multipath in a manner complementary to that performed at the base station to recover the data and pilot received via this multipath. The pilot is typically used for coherent demodulation of various traffics transmitted along with the pilot, which are similarly distorted by the channel response.

The recovered pilot is also typically used by a frequency tracking loop to estimate and correct the frequency error in the downconversion of the multipath from radio frequency to baseband. This frequency error may be estimated based on the amount of phase rotation in the recovered pilot. For the transmit diversity mode in W-CDMA, two pilots are transmitted concurrently from two base station antennas, and the pilot from each base station antenna is typically degraded by channel noise and further independently distorted by fading and multipath in the communication channel. These various phenomena make it challenging to estimate the frequency error based on the diversity transmitted pilots recovered by the terminal. The ability to track out the frequency error affects the performance of the demodulation process, which may in turn affect the performance of the communication system.

There is therefore a need in the art for techniques to effectively perform frequency tracking of a received signal instance based on diversity transmitted pilots in a CDMA communication system.

SUMMARY

Aspects of the invention provide techniques to acquire and track a received signal instance (or multipath) based on one or more transmitted pilots. The multipath includes signal components for a number of (e.g., two) transmitted signals, each of which includes a pilot generated based on a respective pilot symbol pattern. The multipath is processed (e.g., descrambled and decovered) to provide recovered pilot symbols, which may then be used for frequency tracking.

In an aspect, a frequency tracking loop is provided to acquire and track the multipath. In an embodiment, the frequency tracking loop supports a number of loop modes (e.g., an acquisition mode and a tracking mode). Each loop mode may be associated with a respective frequency detector and a set of values for a set of elements in the loop, and may be designed to provide the desired loop performance for the expected operating conditions. For example, the acquisition mode may be designed to more quickly acquire the frequency of the multipath and to track the multipath over a wider range of frequency errors. The tracking mode may be designed to provide improved performance (e.g., lower frequency error standard deviation) over the acquisition mode.

In another aspect, several frequency detectors are provided for deriving estimates of the frequency error in the downconversion of the multipath (e.g., from radio frequency to baseband).

In one frequency detector design, maximum likelihood estimates of the frequency error are derived based on the recovered pilot symbols. When transmit diversity is employed, one of a number of unique groups of pilot symbols is transmitted for each pilot symbol period, with each unique pilot symbol group including a pilot symbol of a specific value for each transmitted signal. For example, a group of {A A} pilot symbols or {A-A} pilot symbols may be transmitted from two base station antennas for each pilot symbol period. To derive a maximum likelihood frequency error estimate, sets of recovered pilot symbols are initially formed, with each set including a number of recovered pilot symbols corresponding to a respective unique pilot symbol group. For example, a first set of recovered pilot symbols may be formed for the pilot symbol group {A A}, and a second set of recovered pilot symbols may be formed for the pilot symbol group {A-A}. A "partial" frequency error estimate is then derived by applying a particular function (e.g., a cross-product) to the recovered pilot symbols in each set. The partial frequency error estimates for all sets are then combined to derive the maximum likelihood frequency error estimate.

In another frequency detector design, the frequency error estimate for the multipath is derived based on the estimated frequency error for each transmitted signal. The recovered pilot symbols corresponding to different unique pilot symbol groups may be combined to derive a pilot estimate for each transmitted signal. The estimated frequency error for each transmitted signal may then be derived based on the pilot estimates for the transmitted signal. The estimated frequency errors for all transmitted signals are then combined to derive the frequency error estimate for the multipath.

The frequency tracking techniques described herein may be advantageously used for the transmit diversity mode (e.g., the STTD node) supported by W-CDMA. These techniques may also be used for other diversity transmitted signals (e.g., pilots) in other CDMA and wireless communication systems.

The invention further provides other methods and apparatus that implement various aspects, embodiments, and features of the invention, as described in further detail below.

BRIEF DESCRIPTION OF THE DRAWINGS

The features, nature, and advantages of the present invention will become more apparent from the detailed description set forth believe when taken in conjunction with the drawings in which like reference characters identify correspondingly throughout and wherein.

DETAILED DESCRIPTION

Figure 1:
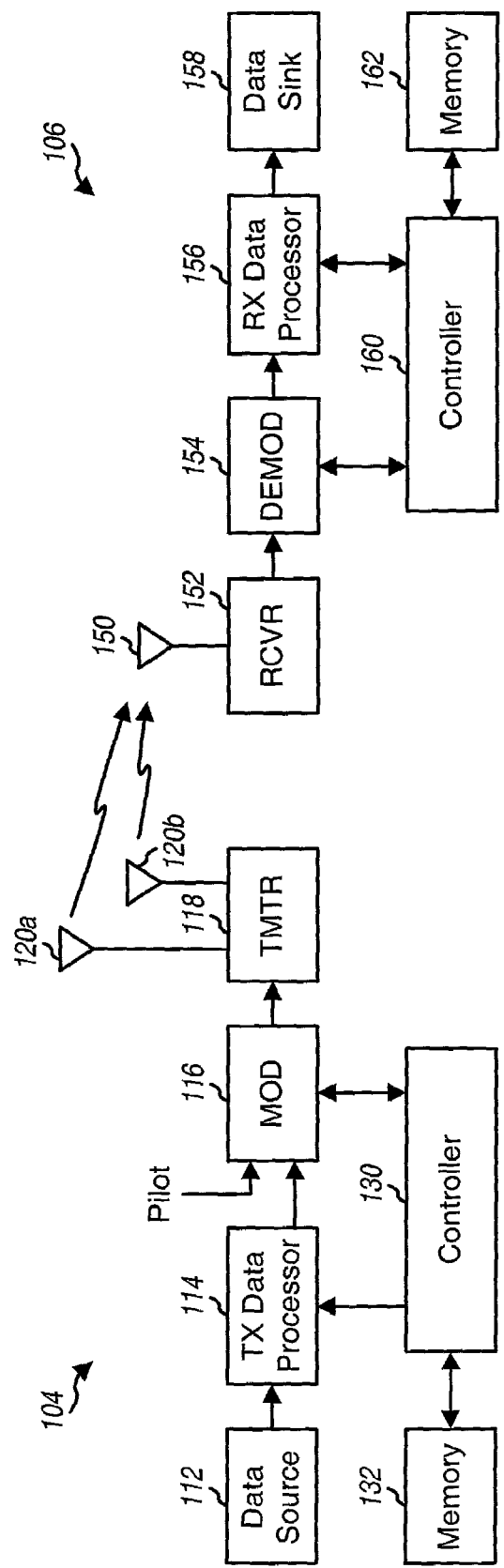
FIG. 1 is a simplified block diagram of an embodiment of a base station and a terminal.

FIG. 1 is a simplified block diagram of an embodiment of a base station 104 and a terminal 106, which are capable of implementing various aspects and embodiments of the invention. On the downlink, at base station 104, a transmit (TX) data processor 114 receives different types of traffic such as user-specific data from a data source 112, messages from a controller 130, and so on. TX data processor 114 then formats and codes the data and messages based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 116 receives pilot data and the coded data from TX data processor 114 and further processes the received data to generate modulated data. For W-CDMA, the processing by modulator 116 includes (1) "covering" the coded and pilot data with different channelization codes to channelize the user-specific data, messages, and pilot data onto their respective physical channels and (2) scrambling the channelized data with a scrambling sequence (which is equivalent to spreading the channelized data with short pseudo-noise (PN) sequences in IS-95 and cdma2000). The modulated data is then provided to a transmitter unit (TMTR) 118 and conditioned (e.g., converted to one or more analog signals, amplified, filtered, and quadrature modulated) to generate one or more downlink modulated signals suitable for transmission via one or more antennas 120 over a wireless link to the terminals.

At terminal 106, the downlink modulated signal(s) are received by an antenna 150 and provided to a receiver unit (RCVR) 152. Receiver unit 152 conditions (e.g., filters, amplifies, downconverts, and digitizes) the received signal and provides data samples. A demodulator (DEMOD) 154 then receives and processes the data samples to provide recovered pilot and data symbols. For W-CDMA, the processing by demodulator 154 includes (1) descrambling the data samples with the same scrambling sequence used for the physical channel(s) being recovered (which is equivalent to despreading the data samples with the short PN sequences), (2) decovering the descrambled samples to channelize the received data and pilot onto their respective physical channels, and (3) coherently demodulating the channelized data with a pilot recovered from the received signal.

Demodulator 154 may be implemented with a rake receiver having a number of finger processors that can process multiple signal instances (or multipaths) in the received signal. A transmitted signal may be received via multiple signal paths, and each received signal instance (or multipath) of sufficient strength may be assigned to, and processed by, a respective finger processor of the rake receiver. Each finger processor processes (e.g., descrambles, decovers, and pilot demodulates) the assigned multipath to provide demodulated symbols for that multipath. The demodulated symbols from all assigned finger processors for each physical channel are typically combined to provide the recovered data symbols for the physical channel.

A receive (RX) data processor 156 then receives and decodes the recovered data symbols from demodulator 154 to recover the user-specific data and messages transmitted on the downlink for the terminal. The recovered messages may be provided to a controller 160 and used to control the processing of a subsequent data transmission. The processing by demodulator 154 and RX data processor 156 is complementary to that performed by modulator 116 and TX data processor 114 at base station 104, respectively. Memories 132 and 162 may be used to store data and codes for controllers 130 and 160, respectively.

W-CDMA supports a "no transmit diversity" mode whereby a downlink data transmission occurs over one base station antenna, and a "transmit diversity" mode whereby a data transmission occurs over two antennas. The transmit diversity mode further includes an open loop mode and a closed loop mode, and the open loop mode further includes a "space time block coding transmit antenna diversity" (STTD) mode. In the STTD mode, the coded data for each physical channel is processed to generate two streams of modulated data, which are then transmitted from two base station antennas. Two different pilot symbol patterns are also used for the two antennas in the STTD mode. In the closed loop mode, the coded data for each physical channel is processed to generate modulated data that is then transmitted from both antennas, with the (complex) gains for the two antennas being adjusted by feedback from the target terminal. Dedicated pilots are also transmitted on the two antennas, with the pilots being orthogonal or the same depending whether closed loop mode 1 or 2, respectively, is used. Details of the various modes supported by W-CDMA for transmit diversity are described in Document No. 3GPP TS 25.211 and 25.214 (for closed loop modes), which is incorporated herein by reference.

Figure 2:
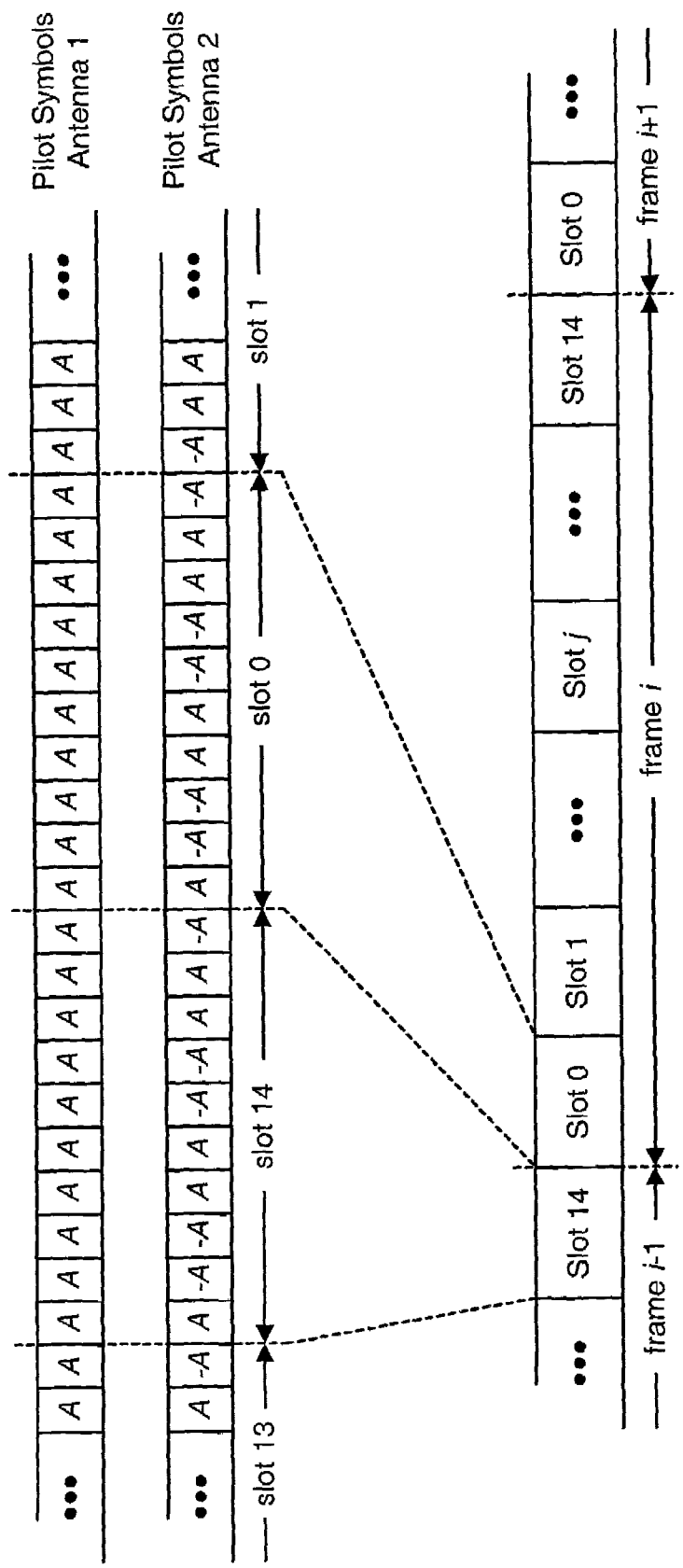
FIG. 2 is a diagram of a downlink common pilot channel (CPICH) defined by the W-CDMA standard.

FIG. 2 is a diagram of a downlink common pilot channel (CPICH) defined by the W-CDMA standard. The CPICH may be used to transmit a common pilot to all terminals in a cell, and is partitioned into frames, with each frame having a duration of 10 msec and including 15 slots labeled as slot 0 through slot 14. Each slot included 2560 chips and is used to transmit 10 pilot symbols. If transmit diversity is used for any downlink channel in the cell, then the CPICH is transmitted from both antennas.

W-CDMA specifies the specific pilot symbol patterns to be used for the two antennas, which are shown in FIG. 2. Each pilot symbol is a complex value, with A=1+j. As shown in FIG. 2, a particular group of pilot symbols (either {A A } or {A-A}) is transmitted from the two antennas for each pilot symbol period. W-CDMA standard specifies only two "unique" pilot symbol groups for the STTD mode, with each unique group including a pilot symbol of a specific value for each transmitted signal.

Figure 3:
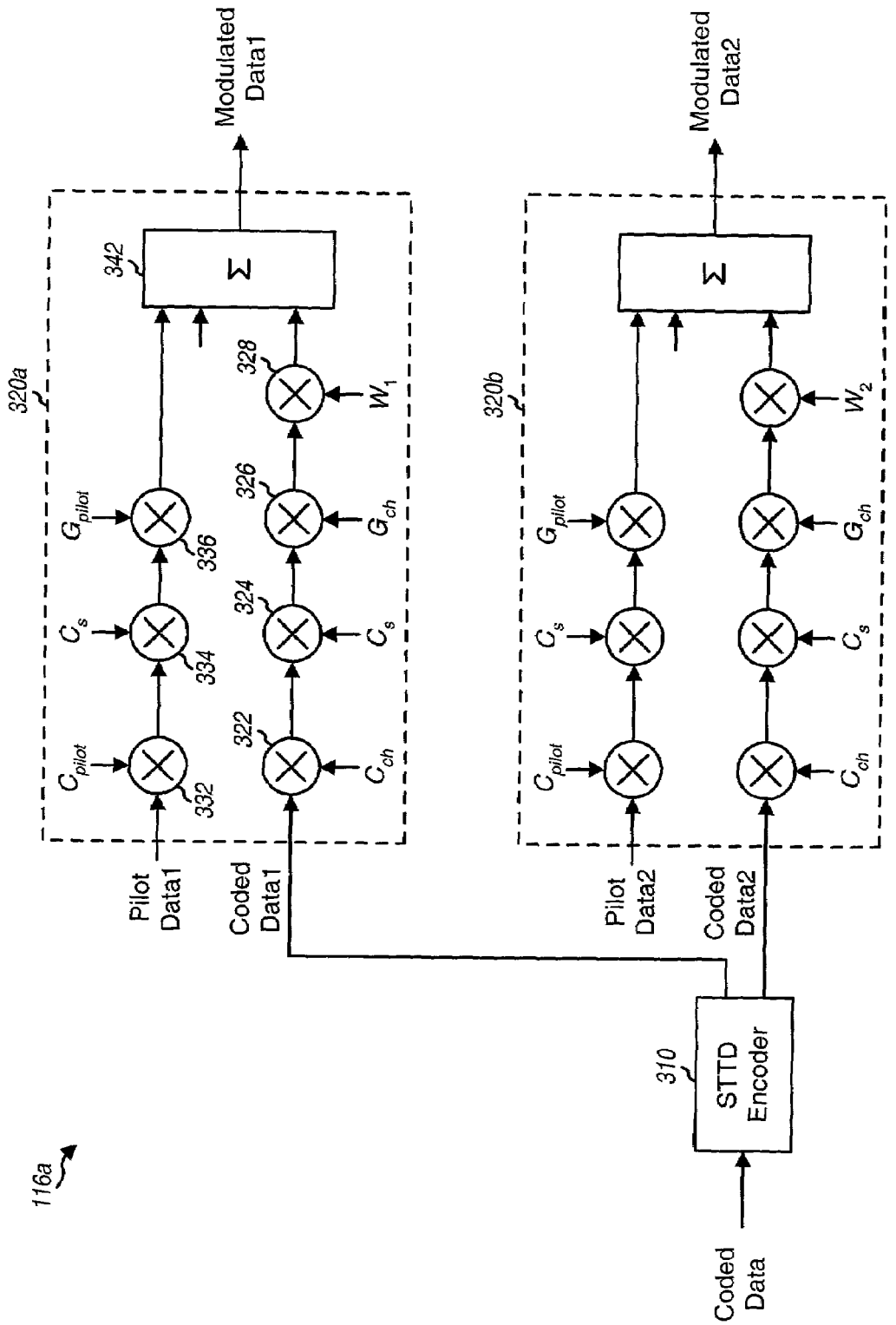
FIG. 3 is a block diagram including a modulate that may be used to process the coded and pilot data for the transmit diversity mode in W-CDMA.

FIG. 3 is a block diagram of a modulator 116a that may be used to process the coded and pilot data for the transmit diversity mode in W-CDMA. Modulator 116a is an embodiment of modulator 116 in FIG. 1. In the STTD mode, the coded data for a particular physical channel is provided to an STTD encoder 310 that encodes the received coded data and provides two STTD coded data streams, Coded Data1 and Coded Data2. Coded Data1 is the same as the received coded data, and Coded Data2 is a shuffled and complex-conjugated version of the received coded data. Each STTD coded data stream is then provided to a respective modulator unit 320.

Within each modulator unit 320, the received Coded Data1 or Coded Data2 is channelized by a multiplier 322 with a channelization code, $C_{ch}$, assigned to the physical channel used to transmit the data. For W-CDMA, the channelization code, $C_{ch}$, is an orthogonal variable spreading factor (OVSF) code having a particular length (or spreading factor) selected based on the data rate of the physical channel. The channelized data is then scrambled with a complex scrambling code, $C_s$, by a multiplier 324, scaled with a weight, $G_{ch}$, by a multiplier 326, and further scaled with a weight, $W_i$, by a multiplier 328. The weight, $G_{ch}$, is used to adjust the transmit power of the physical channel. The weights, $W_1$ and $W_2$, may be used for phase adjustment in the closed loop mode 1 and for phase/amplitude adjustment in the closed loop mode 2, and may be different for each user.

For the STTD mode, each modulator unit 320 further receives and processes a respective pilot symbol stream. The pilot symbols are channelized by a multiplier 332 with a channelization code, $C_{pilot}$, assigned to the CPICH, which is typically the OVSF code of zero. The channelized pilot is then scrambled with the complex scrambling code, $C_s$, by a multiplier 334 and further scaled with a weight, $G_{pilot}$, by a multiplier 336.

For the downlink, data for multiple terminals may be transmitted concurrently by the base station. Thus, the processed (e.g., channelized, scrambled, and weighted) data from multiplier 326, the processed data for other physical channels (which may be intended for the same or some other terminals), the processed pilot, and other data for other physical channels (e.g., a common control physical channel) are combined by an adder 342 to generate modulated data for that antenna.

Figure 4:
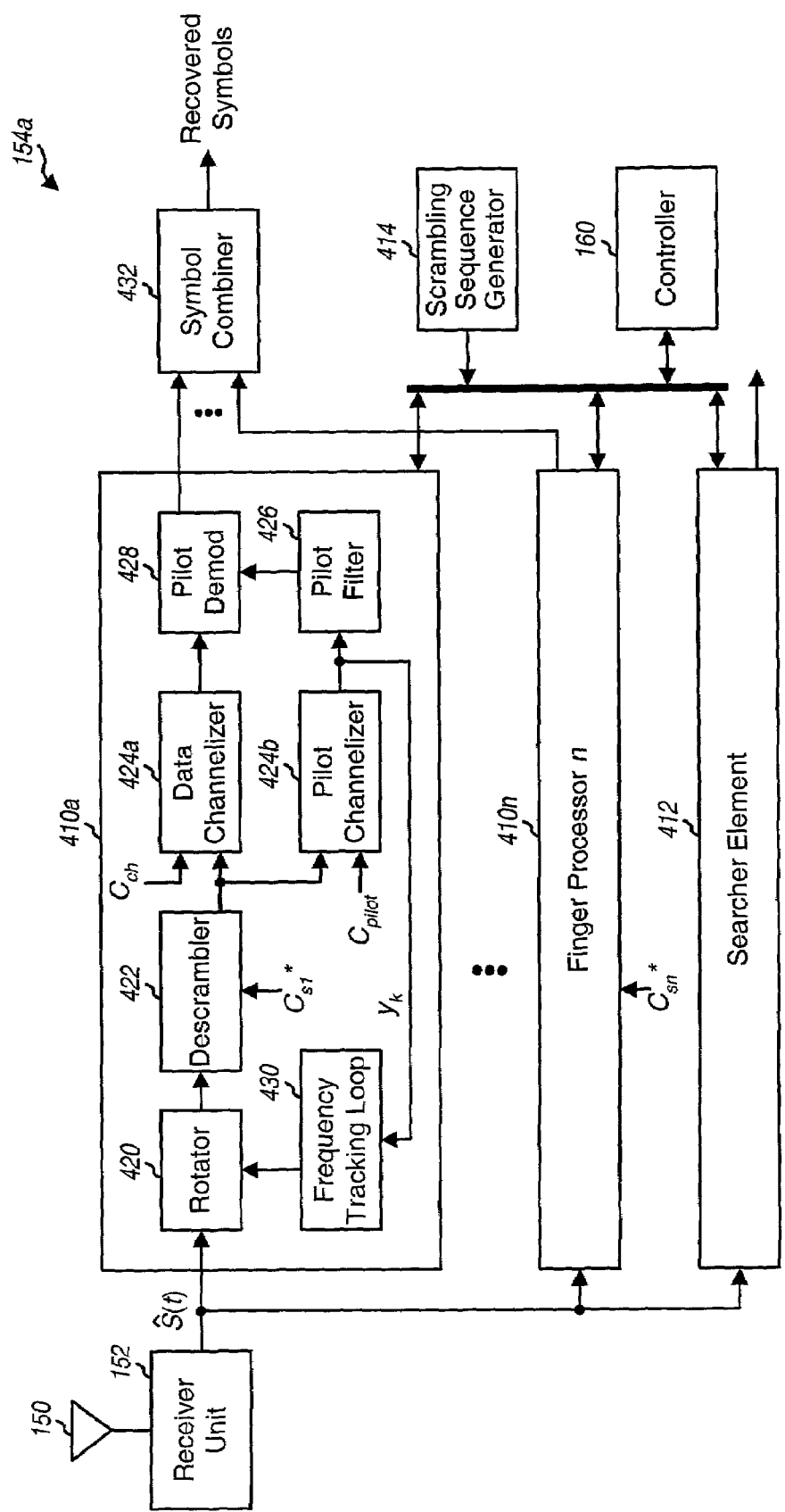
FIG. 4 is a block diagram including a rake receiver capable of receiving and demodulating downlink modulated signals transmitted from one or more base stations.

FIG. 4 is a block diagram of a rake receiver 154a capable of receiving and demodulating the downlink modulated signals transmitted from one or more base stations. Rake receiver 154a may be used to implement demodulator 154 within terminal 106 in FIG. 1. Due to the multipath environment, a downlink modulated signal transmitted from a base station antenna may arrive at the terminal via a number of signal paths. Each base station may also transmit one or two downlink modulated signals, depending on whether or not it is operating in the transmit diversity mode. Thus, the received signal at the terminal may comprise multiple instances of one or two downlink modulated signals from each of one or more base stations. Each signal instance (or multipath) in the received signal is typically associated with a particular magnitude, phase, and arrival time (or time offset).

Receiver unit 152 conditions (e.g., filters and amplifies) the received signal, quadrature downconverts the conditioned signal, and digitizes the downconverted signal to provide data samples. The quadrature downconversion and digitization may be performed in various manners, depending on the specific design of receiver unit 152. In one receiver design, the conditioned signal is quadrature downconverted to baseband (or near baseband) with a locally generated complex carrier signal, and the baseband signals are digitized to provide data samples. In another receiver design, the conditioned signal is initially downconverted to an intermediate frequency (IF), digitized, and digitally quadrature downconverted to baseband with a complex sinusoidal signal to provide the data samples. Thus, depending on the receiver design, the complex signal used for the quadrature downconversion (i.e., the "downconversion signal") may be an analog carrier signal or a digital sinusoidal signal and may be centered at any frequency. The data samples (which are denoted as $\hat{S}(t)$ in FIG. 4) are provided to a number of finger processors 410 and a searcher 412 of rake receiver 154a.

Searcher 412 is used to search for strong multipaths in the received signal and to provide an indication of the strength and timing of each found multipath that meets a set of criteria. Each finger processor 410 of the rake receiver may then be assigned to process a respective multipath of interest (e.g., a multipath of sufficient strength, as determined by controller 160 based on the signal strength information provided by searcher 412).

In the specific embodiment shown in FIG. 4, within each assigned finger processor 410, the data samples are provided to a rotator 420, which performs a complex multiply of the data samples with a complex sinusoidal signal to generate baseband data samples (which are phase rotated samples). Each multipath may be associated with a different Doppler frequency, especially for a mobile terminal. Rotator 420 thus attempts to remove the phase rotation in the data samples due to frequency error in the downconversion of this multipath to baseband. Rotator 420 may be designed to operate on (or phase rotate) near-baseband data samples to generate the baseband data samples. Alternatively, rotator 420 may be designed to perform digital quadrature downconversion of IF data samples to generate the baseband data samples. The complex sinusoidal signal used within rotator 420 may thus be a low frequency sinusoidal or an intermediate frequency sinusoidal.

The baseband data samples from rotator 420 are provided to a descrambler 422, which also receives a (complex-conjugate) descrambling code, $C_{sj}^*$, corresponding to the scrambling code, $C_s$, used at the base station and having a time offset, $t_j$, corresponding to the arrival time of the multipath being processed by the finger processor. Descrambler 422 descrambles (i.e., despreads) the baseband data samples with the descrambling code, $C_{sj}^*$, to provide descrambled samples.

To recover the data on a particular physical channel, a data channelizer 424a first decovers (i.e., multiplies) the descrambled samples with the same channelization code, $C_{ch}$, used for the physical channel being recovered by the finger processor. The decovered data samples are then accumulated over the length of the channelization code, $C_{ch}$, to provide data symbols, also within data channelizer 424a. Since the data on each physical channel is channelized with a different OVSF code, channelizing with the same OVSF code at the terminal effectively extracts the data on the desired physical channel and removes the data on the other physical channels, if orthogonality is maintained between these physical channels after transmission through the communication link. The data symbols from data channelizer 424a represent the data for the multipath being processed by the finger processor.

Similarly, to recover the pilot, a pilot channelizer 424b first decovers the descrambled samples with the same channelization code, $C_{pilot}$, used to channelize the pilot at the base station (e.g., the OVSF code of zero). The decovered pilot samples are then accumulated over a particular accumulation time interval to provide recovered pilot symbols, also within pilot channelizer 424b. The accumulation time interval is typically an integer multiple (i.e., $N_a$=1, 2, and so on) of the pilot channelization code length. If the pilot is channelized with the OVSF code of zero (i.e., a sequence of 256 zeros) and the data on other physical channels are channelized with other OVSF codes, then the accumulation over 256·$N_a$ chips effectively removes the data on the other physical channels and only the pilot is extracted, if orthogonality between the physical channels is maintained after transmission through the communication link.

The recovered pilot symbols from pilot channelizer 424b represent the pilot recovered for the multipath being processed by the finger processor. The recovered pilot symbols are then provided to a pilot filter 426 and filtered based on a particular lowpass filter response to remove noise. Pilot filter 426 may be implemented as a finite impulse response filter (FIR), an infinite impulse response (IIR) filter, or some other filter structure. Pilot filter 426 then provides pilot estimates to a pilot demodulator 428.

Pilot demodulator 428 receives and demodulates the data symbols with the pilot estimates to generate demodulated symbols, which are then provided to a symbol combiner 432. Symbol combiner 432 receives and coherently combines the demodulated symbols from all finger processors 410 assigned to process the received signal, and provides recovered data symbols to RX data processor 156 for further processing. The pilot demodulation and symbol combining may be achieved as described in U.S. Pat. No. 5,764,687 patent, which is incorporated herein by reference.

In the embodiment shown in FIG. 4, a frequency tracking loop 430 is provided for each finger processor 410 and used to acquire and track the frequency of the multipath being processed by the finger processor. Frequency tracking loop 430 attempts to lock the frequency (and possibly the phase) of the complex sinusoidal signal used within rotator 420 to the frequency of the multipath being processed by the finger processor. The frequency error in the downconversion of the multipath to baseband is reflected in the rotation of the phase of the pilot, with a larger frequency error corresponding to a higher rate of phase rotation. In an embodiment, the frequency tracking of the multipath is achieved based on the recovered pilot, and the frequency error may be estimated based on the phase difference between consecutive recovered pilot symbols. In another embodiment, the frequency tracking of the multipath is achieved based on the recovered data. Frequency tracking based on the recovered pilot is described in further detail below.

Within frequency tracking loop 430, the frequency error estimates are filtered to provide a frequency control. For the embodiment shown in FIG. 4, rotator 420 of each assigned finger processor 410 receives and uses the frequency control to reduce the frequency error in the baseband data samples. In some other receiver designs (not shown), the frequency control may be used to adjust the frequency/phase of the complex signal used for quadrature downconversion, to reduce the frequency error in the baseband data samples.

In an embodiment, frequency tracking loop 430 supports a number of loop modes, e.g., an acquisition mode and a tracking mode. The acquisition mode may be used to more quickly acquire the frequency of the multipath and to track the multipath over a wider range of frequency errors (e.g., up to ±5 KHz). The tracking mode may be used to track the multipath over a narrower range of frequency errors (e.g., less than ±1 KHz) and may provide improved performance (e.g., lower frequency error standard deviation) over the acquisition mode.

Figure 5A:
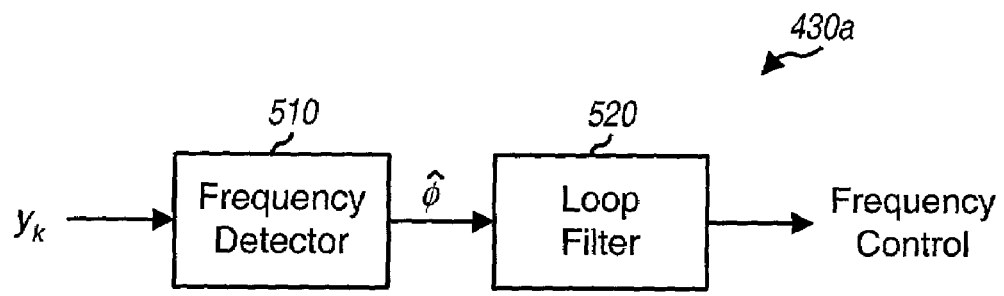
FIG. 5A is a block diagram of a frequency tracking loop used to acquire and track a specific multipath in the received signal.

FIG. 5A is a block diagram of a frequency tracking loop 430a used to acquire and track a specific multipath in the received signal. Frequency tracking loop 430a may be used for frequency tracking loop 430 in FIG. 4, and is capable of implementing various aspects and embodiments of the invention.

Frequency tracking loop 430a includes a frequency detector 510 coupled to a loop filter 520. Frequency detector 510 receives the recovered pilot symbols, $y_k$, from pilot channelizer 424b within the same finger processor and derives estimates of the frequency error in the downconverted multipath based on the recovered pilot symbols. The frequency error estimates, $\hat{\phi}$, from frequency detector 510 are provided to loop filter 520, which filters the frequency error estimates to provide the frequency control. The frequency control is then used to adjust the frequency and/or phase of the complex sinusoidal signal used within rotator 420 to reduce the frequency error. Each element of loop filter 520a is described in further detail below.

Frequency Detector or Discriminator

Various frequency detectors may be designed and used for frequency tracking of the multipath. Several frequency detectors are described in detail below, and others may also be used and are within the scope of the invention.

The received signal, r(t), at the terminal may be expressed as:

$$r(t)=s_1(t)\cos(\omega_c t)+s_Q(t)\sin(\omega_c t)+n(t), \qquad \text{Eq (1)}$$

where
- $s_1(t)$ and $s_Q(t)$ are the inphase and quadrature components, respectively, of the received signal at baseband, had it been noise-free,
- n(t) is the zero-mean additive white Gaussian noise (AWGN) with a spectral height of $N_0/2$, and
- $\omega_c=2\pi f_c$, where $f_c$ is the carrier frequency of the received signal (i.e., the "received carrier signal").

The noise-free complex baseband signal, S(t), may be expressed as:

$$S(t)=s_1(t)+js_Q(t). \qquad \text{Eq (2)}$$

The received signal, r(t), is quadrature downconverted (e.g., to baseband or near baseband) with a complex downconversion signal, $\cos(\omega_c t+\Delta\omega)+j \sin(\omega_c t+\Delta\omega)$, within receiver unit 152. The downconverted signal, $\hat{S}(t)$, may be expressed as:

$$\hat{S}(t) = S(t)e^{j(\Delta\omega t+\theta)} + N(t) \qquad \text{Eq (3)}$$
$$= \hat{s}_I(t) + j\hat{s}_Q(t),$$

where
$\Delta\omega$ is the frequency error (in radian per second) of the downconversion signal relative to the received carrier signal,
$\phi$ is the phase difference between the downconversion and received carrier signals,
$N(t)=n_1(t)+jn_Q(t)$, is the complex baseband noise, and $$\hat{s}_I(t)=s_I(t)\cos(\Delta\omega t+\theta)-s_Q(t)\sin(\Delta\omega t+\theta)+n_I(t),$$

$$\hat{s}_Q(t)=s_I(t)\sin(\Delta\omega t+\theta)+s_Q(t)\cos(\Delta\omega t+\theta)+n_Q(t). \qquad \text{Eq (4)}$$

If there is no frequency error (i.e., $\Delta\omega=0$) and phase difference is also zero (i.e., $\theta=0$), then the downconverted components reduces to:

$$\hat{s}_I(t)=s_I(t)+n_I(t), \text{ and}$$

$$\hat{s}_Q(t)=s_Q(t)+n_Q(t). \qquad \text{Eq (5)}$$

If the base station employs transmit diversity, then the complex baseband signal transmitted from the i-th antenna may be expressed as:

$$S_i(t)=s_{iI}(t)+js_{iQ}(t). \qquad \text{Eq (6)}$$

The downconverted signal, $\hat{S}(t)$, at the terminal may then be expressed as:

$$\hat{S}(t)=[\alpha_1 S_1(t)+\alpha_2 S_2(t)]e^{j(\Delta\omega t+\theta)}+N(t), \qquad \text{Eq (7)}$$

where $\alpha_1$ and $\alpha_2$ are the complex fading coefficients corresponding to the first and second antennas, respectively.

If the complex baseband signal is assumed to include only the pilot (i.e., the coded data in the baseband signal is not considered), then the baseband signal for each antenna may be expressed as:

$$S_1(t)=p_{1k}C_s(t),$$

$$S_2(t)=p_{2k}C_s(t), \qquad \text{Eq (8)}$$

where
$P_{ik}$ is the complex pilot symbol transmitted from the i-th antenna in the k-th pilot symbol period (i.e., for $t\in[(k-1)T_p, kT_p]$, where $T_p$ is a pilot symbol period), and
$C_s(t)$ is the complex scrambling code used for both antennas.

As specified by W-CDMA and shown in FIG. 2, the pilot symbols for the two antennas in the STTD mode have the following pattern:

$$P_{1k}=A \;\forall k, \text{ and}$$

$$P_{2k}=\pm A. \qquad \text{Eq (9)}$$

As shown in FIG. 2 and equation (9), the pilot symbol pattern for the first antenna is a sequence of all A symbols, and the pilot symbol pattern for the second antenna is a specific sequence of $\pm A$ symbols.

If only the pilot is considered, the downconverted signal, $\hat{S}(t)$, at the terminal may be expressed as:

$$\hat{S}(t) = [\alpha_1 p_{1k}C_s(t)+\alpha_2 p_{2k}C_s(t)]e^{j(\Delta\omega t+\theta)}+N(t), \qquad \text{Eq (10)}$$
$$= [\alpha_1+\alpha_2 m_k]AC_s(t)e^{j(\Delta\omega t+\theta)}+N(t),$$

where $m_k$ is the sign of the pilot symbol in the k-th pilot symbol period for the second antenna, i.e., $m_k \in \{-1,+1\}$.

To recover the pilot at the terminal, the downconverted signal, $\hat{S}(t)$, is first descrambled with the complex-conjugate scrambling sequence, $C_s^*(t)$, then decovered with the pilot channelization code, $C_{pilot}$, and further integrated over each pilot symbol period. If the channelization code, $C_{pilot}$, for the pilot is a sequence of all zero (i.e., the OVSF code of zero), then the decovering may be omitted. The recovered pilot symbol, $y_k$, for the k-th pilot symbol period may be expressed as:

$$y_k = \frac{A^*}{2\|A\|^2}\frac{1}{T_p}\int_{(k-1)T_p}^{kT_p}\hat{S}(t)C_s^*(t)dt, \qquad \text{Eq (11)}$$
$$= (\alpha_1+m_k\alpha_2)x_k+n_k,$$

where A* denotes the complex-conjugate of A (i.e., A*=1−j when A=1+j), $$x_k = \frac{1}{2T_p}\int_{(k-1)T_p}^{kT_p}|C_s(t)|^2 e^{j(\Delta\omega t+\theta)}dt, \qquad \text{Eq (12)}$$

and $n_k$ is the additive Gaussian noise that is approximately independent and may be expressed as:

$$n_k = \frac{A^*}{2\|A\|^2}\frac{1}{T_p}\int_{(k-1)T_p}^{kT_p}N(t)C_s^*(t)dt.$$

The recovered pilot symbol, $y_k$, may also be expressed as:

$$y_k=(\alpha_1+m_k\alpha_2)\tilde{g}(\phi)e^{jk\phi}+n_k, \qquad \text{Eq (13)}$$

where $\phi=\Delta\omega T=2\pi\Delta f T_s$, $\Delta f$ is the frequency error, and $T_s$ is the pilot symbol period (which is $256/3,840,000$ seconds for W-CDMA), and $\tilde{g}(\phi)$ is dependent on $C_s(t)$ and may be expressed as:

$$\tilde{g}(\phi) \approx e^{j\theta}\text{sinc}\left(\frac{\phi}{2}\right)e^{-j\phi/2}.$$

As described above, $\phi$ is related to the frequency error in the downconversion of the multipath being processed. Various frequency detectors may be used to derive estimates of the frequency error based on the recovered pilot symbols, $y_k$.

In a first frequency detector design, maximum likelihood estimates of the frequency error are derived based on the recovered pilot symbols. For a vector of K recovered pilot symbols, $\bar{y}=[y_1 y_2 \ldots y_K]$, the maximum likelihood estimate, $\hat{\phi}$, of the frequency error, $\phi$, is the solution to the following optimization problem:

$$\hat{\phi} = \underset{\phi}{\operatorname{argmax}}\{Pr(\overline{y}|\phi)\}, \qquad \text{Eq (14)}$$

where $Pr(\overline{y}|\phi)$ is a probability density function of the pilot symbol vector, $\overline{y}$, given a particular value of $\phi$.

Several changes in notation may be made to simplify the following derivations. First, let $h(k,\phi)=\tilde{g}(\phi)e^{jk\phi}$. Next, since $m_k \in \{-1,+1\}$ for all k, a set I may be defined as $I=\{k|m_k=1\}$, and a complementary set $I^c$ may be defined as $I^c=\{k|m_k=-1\}$. The set I thus includes all positive (i.e., A) pilot symbols for the second antenna, and the complementary set $I^c$ includes all negative (i.e., -A) pilot symbols. Also, the following terms can be defined: $\beta_1=\alpha_1+\alpha_2$ and $\beta_2=\alpha_1-\alpha_2$. Since the fading coefficients, $\alpha_i$, are independent and identically distributed (i.i.d) and Gaussian, it can be shown that $\beta_i$ is also i.i.d and Gaussian, with twice the variance of $\alpha_i$.

Using the above definitions, the recovered pilot symbol, $y_k$, in equation (13) may be expressed as:

$$y_k = \beta_{i(k)} h(k,\phi) + n_k, \qquad \text{Eq (15)}$$

where $$i(k) = \begin{cases} 1 & k \in I \\ 2 & k \in I^c \end{cases}.$$

The probability density function, $Pr(\overline{y}|\phi)$, can then be expressed as:

$$Pr\{\overline{y}|\phi\} = \int Pr_{\overline{y}|\phi,\beta_1,\beta_2} p_{\beta_1,\beta_2} d\beta_1 d\beta_2, \qquad \text{Eq (16)}$$

where
- $Pr_{\overline{y}|\phi,\beta_1,\beta_2}$ is a probability density function of the pilot symbol vector, $\overline{y}$, given a specific set of values for $\phi$, $\beta_1$, and $\beta_2$, and
- $P_{\beta_1,\beta_2}$ is a joint probability density function of $\beta_1$ and $\beta_2$.

Solving for equation (16) and substituting it into equation (14), the maximum likelihood estimate, $\hat{\phi}$, of the frequency error, $\phi$, may be expressed as:

$$\hat{\phi} = \underset{\phi}{\operatorname{argmax}} \left\{ \frac{1}{2\sigma^2} \frac{\left\| \sum_{k \in I} y_k^* e^{jk\phi} \right\|^2 + \left\| \sum_{k \in I^c} y_k^* e^{jk\phi} \right\|^2}{1 + \frac{\sigma^2}{\sigma_\beta^2} \cdot \frac{2}{k\operatorname{sinc}^2(\sigma/2)}} - \ln\left(\frac{\sigma^2}{\sigma_\beta^2} + \frac{K}{2}\operatorname{sinc}^2(\phi/2)\right) \right\}. \qquad \text{Eq (17)}$$

For small $\phi$, the function $\operatorname{sinc}^2(\phi/2) \approx 1$, and equation (17) may be simplified as follows:

$$\hat{\phi} \cong \underset{\phi}{\operatorname{argmax}} \left\{ \left\| \sum_{k \in I} y_k^* e^{jk\phi} \right\|^2 + \left\| \sum_{k \in I^c} y_k^* e^{jk\phi} \right\|^2 \right\}, \qquad \text{Eq (18)}$$

Equation (18) states that the maximum likelihood estimate, $\hat{\phi}$, of the frequency error may be found by (1) evaluating an objective function of $\phi$ (i.e., the function within the { } in equation (18)), (2) identifying the maximum value for the objective function, and (3) providing the specific value of $\phi$ corresponding to this maximum value as the maximum likelihood estimate, $\hat{\phi}$, of the frequency error. The objective function includes two terms, with the left term covering the recovered pilot symbols for set I (for pilot symbol periods where the same pilot symbols A and A are transmitted from both antennas) and the second term covering the recovered pilot symbols for the complementary set $I^c$ (for pilot symbol periods where the pilot symbols A and -A are respectively transmitted from the first and second antennas). Each term may be evaluated as an FFT of the associated set, I or $I^c$, with the missing pilot symbols in the set replaced with zeros. For example, the left term may be evaluated as an FFT of a pilot symbol set of length K, which includes a pilot symbol of value A for each pilot symbol in set I and a value of zero for each pilot symbol in the complementary set $I^c$.

Although equation (18) was derived with the assumption that the frequency error, $\phi$, is small, the numerical solutions of equation (17) are close to the solutions obtained by solving equation (18) for all values of $\phi \in [-\pi, \pi]$, which corresponds to frequency error values of $\Delta f \in [-7.5, 7.5]$ KHz, which typically covers the frequency error range of interest.

Equation (18) may further be simplified for various specific pilot transmission schemes. If no transmit diversity is employed at the base station (i.e., one antenna is used for data transmission) and the pilot symbols are all A, then equation (18) may be simplified as follows:

$$\hat{\phi} \cong \underset{\phi}{\operatorname{argmax}} \left\{ \left\| \sum_{k=1}^{K} y_k^* e^{jk\phi} \right\|^2 \right\}. \qquad \text{Eq (19)}$$

Equation (19) states that for no transmit diversity, the maximum likelihood estimate for $\phi$ may be obtained by taking the FFT of a set of K recovered pilot symbols and finding the $\phi$ corresponding to the maximum square amplitude.

For no transmit diversity with K=2, equation (19) may be further simplified as follows:

$$\hat{\phi} = \underset{\phi}{\operatorname{argmax}}\{\operatorname{Re}(y_1 y_2^* e^{j\phi})\}, \qquad \text{Eq (20)}$$

and the solution may be expressed as:

$$\hat{\phi} = -\angle(y_1 y_2^*), \qquad \text{Eq (21)}$$

where $\angle$ denotes the angle of the associated complex argument. This solution may be approximated as:

$$\hat{\phi} \approx -\operatorname{Im}(y_1 y_2^*), \qquad \text{Eq (22)}$$

which is a cross-product of the recovered pilot symbols, $y_1$ and $y_2$.

If transmit diversity is employed at the base station (i.e., two antennas are used for data transmission), then equation (18) may be simplified based on the value of K and the specific pilot symbol pattern used for the second antenna (assuming that the pilot symbol pattern of all A is used for the first antenna). For K=4 and a (diversity) pilot symbol pattern of [A A -A -A] for the second antenna, equation (18) may be simplified as follows:

$$\hat{\phi} = \arg\max_{\phi}\{\text{Re}[(y_1y_2^* + y_3y_4^*)e^{j\phi}]\}, \quad \text{Eq (23)}$$

and the solution may be expressed as:

$$\hat{\phi} = -\angle(y_1y_{2*}+y_3y_4^*), \quad \text{Eq (24)}$$

which may be approximated as:

$$\hat{\phi} \cong -Im(y_1y_{2*}+y_3y_4^*). \quad \text{Eq (25)}$$

For K=4 and a diversity pilot symbol pattern of [A-A A-A] for the second antenna, equation (18) may be simplified as follows:

$$\hat{\phi} = \arg\max_{\phi}\{\text{Re}[(y_1y_3^* + y_2y_4^*)e^{j2\phi}]\}, \quad \text{Eq (26)}$$

and the solution may be expressed as:

$$\hat{\phi} = -\frac{1}{2}\angle(y_1y_3^* + y_2y_4^*), \quad \text{Eq (27)}$$

which may be approximated as:

$$\hat{\phi} \cong -Im(y_1y_3^* + y_2y_4^*). \quad \text{Eq (28)}$$

For the diversity pilot symbol pattern of [A-A A-A], the solution in equation (27) is a function of 2φ. And for the diversity pilot symbol pattern of [A A-A-A], the solution in equation (24) is a function of φ. The diversity pilot symbol pattern of [A A-A-A] thus has twice the pull-in range of the diversity pilot symbol pattern of [A-A A-A].

Referring back to FIG. 5A, frequency detector 510 may be designed to receive the recovered pilot symbols, $y_k$, from pilot channelizer 424b within the same finger processor and derive the maximum likelihood estimates, $\hat{\phi}$, of the frequency error based on the general solution shown in equation (17) or (18). If the specific (diversity) pilot symbol pattern used by the base station is known, then frequency detector 510 may be designed to implement the simplified solutions or the approximated solutions for the known K and pilot symbol pattern.

For example, if the base station supports no transmit diversity and transmit diversity with a diversity pilot symbol pattern of [A A-A-A], then frequency detector 510 may be designed to implement either the set of simplified solutions shown in equations (21) and (24) or the set of approximated solutions shown in equations (22) and (25). One of the implemented solutions may then be selected depending whether no transmit diversity or transmit diversity is used by the base station.

Figure 5B:
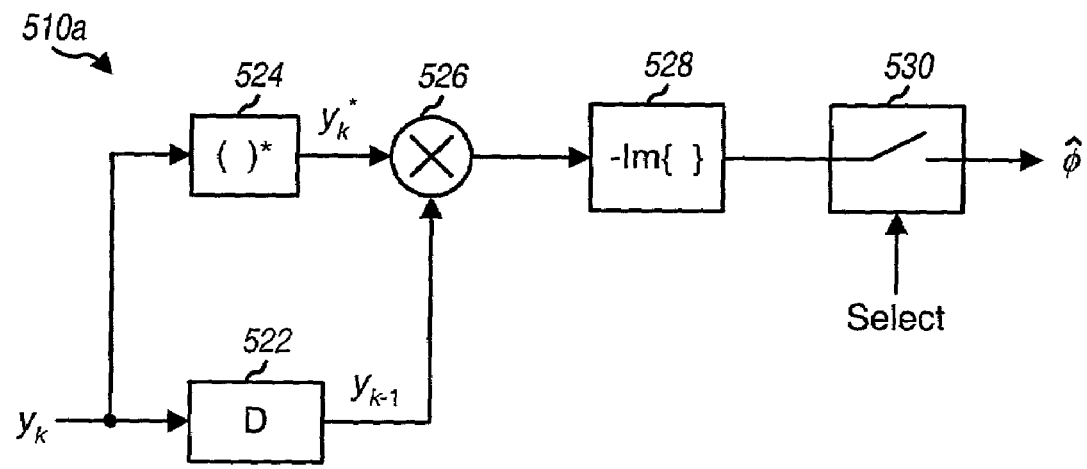
FIGS. 5B, 5C, and 5D are diagrams of three frequency detectors that may be used for the transmit diversity mode supported by W-CDM.

FIG. 5B is a diagram of an embodiment of a frequency detector 510a that may be used for the no transmit diversity mode and the transmit diversity mode with K=4 and the diversity pilot symbol pattern of [A A-A-A]. Frequency detector 510a may be used to implement the approximated solution shown in equations (22) and (25), and may be used for frequency detector 510 in FIG. 5A.

As shown in FIG. 5B, the recovered pilot symbols, $y_k$, are provided to a delay element 522, which provides one pilot symbol period of delay (e.g., 256 chips). The recovered pilot symbol, $y_k$, is also complex-conjugated in block 524 and multiplied by a multiplier 526 with the delayed recovered pilot symbol, $y_{k-1}$, from delay element 522. The result from multiplier 526 is provided to block 528, which extracts the imaginary part of the result and provides the negative imaginary part.

If no transmit diversity is used at the base station, then one frequency error estimate, $\hat{\phi}$, may be provided for each recovered pilot symbol. Each frequency error estimate, $\hat{\phi}$, may be derived based on the current and previous recovered pilot symbols, $y_k$ and $y_{k+1}$ as shown in equation (22). In this case, a switch 530 may be closed at all times.

If transmit diversity with K=4 and the pilot symbol pattern of [A A-A-A] is used at the base station, then one (complete) frequency error estimate, $\hat{\phi}$, may be provided for every four recovered pilot symbols. However, as shown in equation (25), each frequency error estimate, $\hat{\phi}$, may be decomposed into two terms, $-Im(y_1y_2^*)$ and $-Im(y_3y_4^*)$, with each term covering a pair of "like-kind" recovered pilot symbols (i.e., corresponding to the same unique pilot symbol group). Frequency detector 510a can provide a "partial" frequency error estimate for each pair of like-kind recovered pilot symbols (e.g., one partial estimate for a pair of recovered pilot symbols corresponding to A A on the second antenna, and one partial estimate for a pair of recovered pilot symbols corresponding to -A-A on the second antenna). Each partial frequency error estimate may be derived based on the current and previous recovered pilot symbol, $y_k$ and $y_{k+1}$, and may be provided to the loop filter as it is derived. In this case, switch 530 may be closed for the appropriate every second pilot symbol period, as determined by a Select signal.

In a second frequency detector design, the frequency error estimate for the multipath is derived based on the estimated frequency error for each base station antenna (i.e., each transmitted signal). For each pair of "non like-kind" pilot symbols transmitted from the second antenna (i.e., corresponding to different unique pilot symbol groups), the recovered pilot symbols may be combined to derive a pilot estimate for each antenna. For K=4 and the diversity pilot symbol pattern of [A-A-A A] (which is simply a shifted version of [A A-A-A]), the recovered pilot symbols may be expressed as:

$$y_1 = (A\alpha_1 + A\alpha_2)g'_1(\phi) + n_1,$$

$$y_2 = (A\alpha_1 - A\alpha_2)g'_2(\phi) + n_2,$$

$$y_3 = (A\alpha_1 - A\alpha_2)g'_3(\phi) + n_3,$$

$$y_4 = (A\alpha_1 + A\alpha_2)g'_4(\phi) + n_4, \quad \text{Eq (29)}$$

where $g'_k(\phi) = \tilde{g}(\phi)e^{jk\phi}$. The complex fading coefficients, $\alpha_i$, are functions of time, but are not expressed as such in equation (29) for simplicity. For the first pair of pilot symbols in the diversity pilot symbol pattern (i.e., A-A), the pilot estimate, $y_2^1$, for the first antenna may be derived as:

$$\begin{aligned} y_2^1 &= y_1 + y_2, \\ &= (A\alpha_1 + A\alpha_2)g'_1(\phi) + (A\alpha_1 - A\alpha_2)g'_2(\phi) + n_1 + n_2, \\ &= A\alpha_1(g'_1(\phi) + g'_2(\phi)) + A\alpha_2(g'_1(\phi) - g'_2(\phi)) + n_1 + n_2, \\ &\approx 2A\alpha_1 g''(\phi) + n'_1, \end{aligned} \quad \text{Eq (30)}$$

where $g''(\phi) = \tilde{g}(\phi)e^{j3\phi/2}$, and where the last approximation holds when φ is small (which is the case during tracking). The pilot estimate, $y_2^2$, for the second antenna may be derived as:

$$y_2^2 = y_1 - y_2, \qquad \text{Eq (31)}$$
$$\approx 2A\alpha_2 g''(\phi) + n_2'.$$

For the second pair of pilot symbols in the diversity pilot symbol pattern (i.e., -A A), the pilot estimate, $y_4^1$, for the first antenna may be derived as:

$$y_4^1 = y_3 + y_4, \qquad \text{Eq (32)}$$
$$\approx 2A\alpha_1 g''(\phi) e^{j2\phi} + n_3'.$$

and the pilot estimate, $y_4^2$, for the second antenna may be derived as:

$$y_4^2 = -y_3 + y_4, \qquad \text{Eq (33)}$$
$$\approx 2A\alpha_2 g''(\phi) e^{j2\phi} + n_4'.$$

The frequency error estimate, $\hat{\phi}$, may then be derived based on the pilot estimates for the first and second antennas, as follows:

$$\hat{\phi} \approx -Im(y_2^1 y_4^{1*} + y_2^2 y_4^{2*}). \qquad \text{Eq (34)}$$

In equation (34), the frequency error estimate, $\hat{\phi}$, may be decomposed into two terms. The first term $-Im(y_2^1 y_4^2)$ is representative of the frequency error estimate for the signal transmitted from the first antenna, and the second term $-Im(y_2^2 y_4^2)$ is representative of the frequency error estimate for the signal transmitted from the second antenna.

Figure 5C:
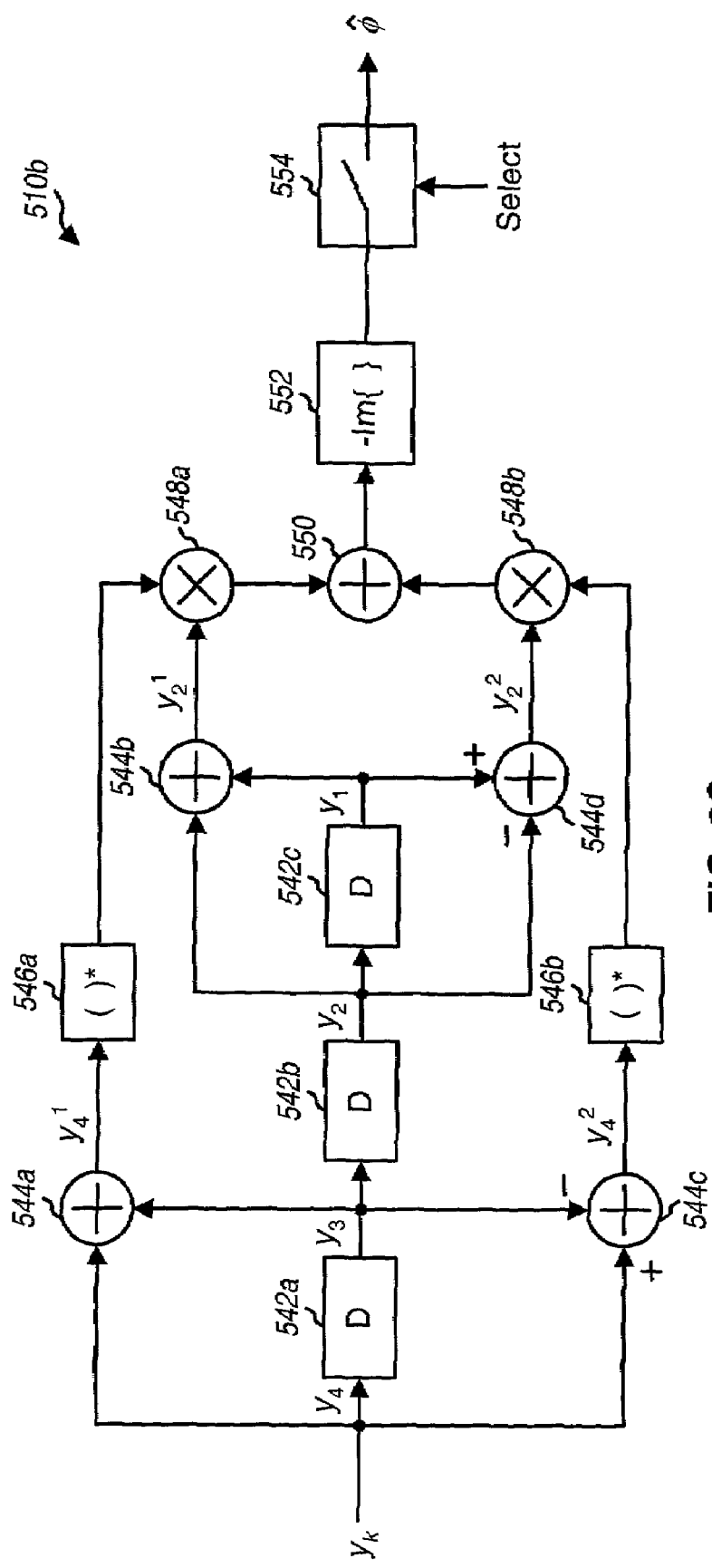

FIG. 5C is a diagram of an embodiment of a frequency detector 510b that may be used to derive pilot estimates for the signal transmitted from each base station antenna, and to derive the frequency error estimate for the multipath based on the pilot estimates. Frequency detector 510b may be used to implement the approximated solution shown in equation (34) and may also be used for frequency detector 510 in FIG. 5A.

As shown in FIG. 5C, the recovered pilot symbols, $y_k$, are provided to a set of delay elements 542a, 542b, and 542c. Each delay element 542 provides one pilot symbol period of delay (e.g., 256 chips). The recovered pilot symbols at the input of delay element 542a and the outputs of delay elements 542a, 542b, and 542c are denoted as $y_4$, $y_3$, $y_2$, and $y_1$, respectively.

A summer 544b adds $y_1$ and $y_2$ to provide the first pilot estimate, $y_2^1$, for the first base station antenna, and a summer 544a adds $y_3$ and $y_4$ to provide the second pilot estimate, $y_4^1$, for the first antenna. Similarly, a summer 544d subtracts $y_2$ from $y_1$ to provide the first pilot estimate, $y_2^2$, for the second base station antenna, and a summer 544c subtracts $y_3$ from $y_4$ to provide the second pilot estimate, $y_4^2$, for the second antenna. The pilot estimate, $y_4^1$, is complex-conjugated by block 546a and multiplied with the pilot estimate, $y_2^1$, by a multiplier 548a to provide the term, $y_2^1 y_4^1$. Similarly, the pilot estimate, $y_4^2$, is complex-conjugated by block 546b and multiplied with the pilot estimate, $y_2^2$, by a multiplier 548b to provide the term, $y_2^2 y_4^2$.

A summer 550 then adds the terms, $y_2^1 y_4^{1*}$ and $y_2^2 y_4^{2*}$, from multipliers 548a and 548b, and the result is provided to block 552, which extracts the imaginary part of the result and provides the negative imaginary part. Since one (complete) frequency error estimate, $\hat{\phi}$, is provided for each pilot symbol set of [A-A-A A], a switch 554 is closed at the appropriate every fourth pilot symbol period to provide the frequency error estimate, $\hat{\phi}$.

Figure 5D:
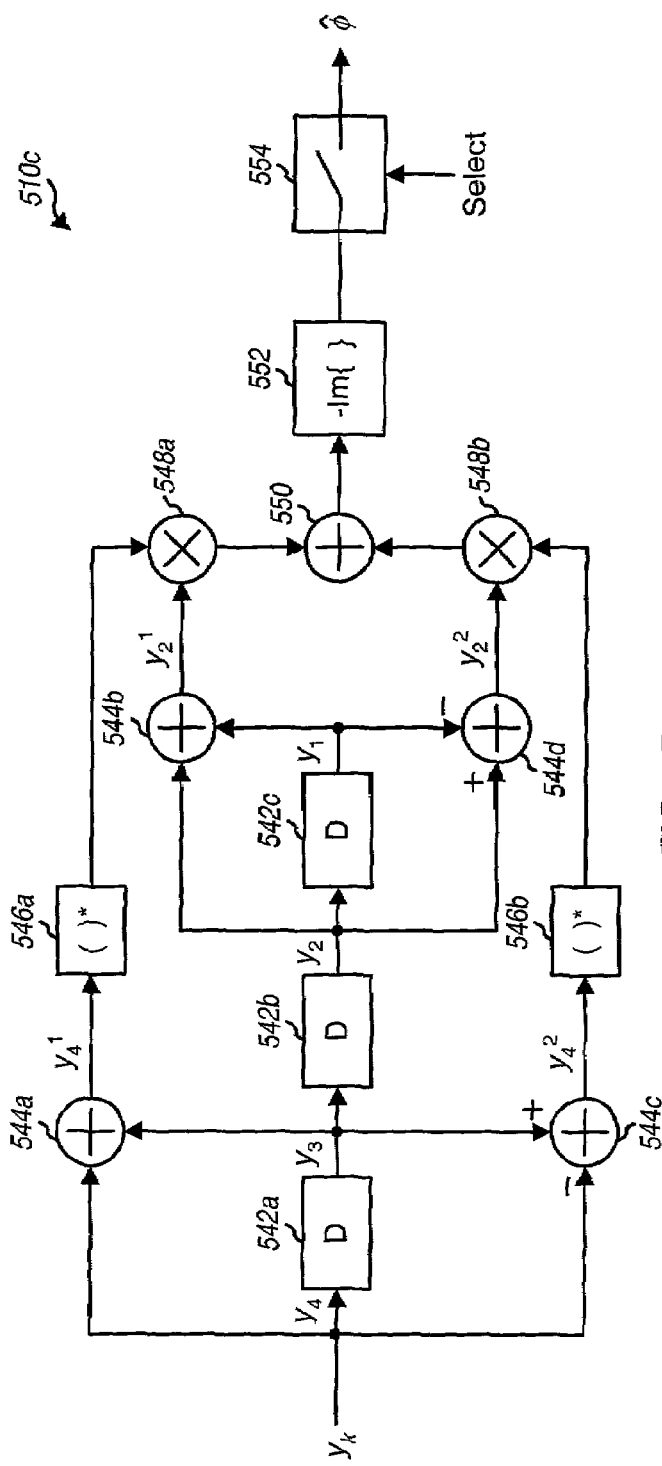

FIG. 5D is a diagram of an embodiment of a frequency detector 510c that may also be used to derive frequency error estimate for the multipath based on pilot estimates for the signal transmitted from each base station antenna. Frequency detector 510c is designed to operate on pilot symbol sets of [-A A A-A], and is similar in structure to frequency detector 510b in FIG. 5C which is designed to operate on pilot symbol sets of [A-A-A A]. However, the positions of the signs (+) and (−) in subtractors 544c and 544d are switched for the pilot symbol set [-A A A-A]. Again, one complete frequency error estimate, $\hat{\phi}$, is provided for each pilot symbol set of [-A A A-A], and switch 554 is closed at the appropriate every fourth pilot symbol period to provide the frequency error estimate.

Referring back to FIG. 2, the pilot symbol set of [-A A A-A] is repeated every fourth pilot symbol period, and is offset by two pilot symbol periods from the pilot symbol set of [A-A-A A] which is also repeated every fourth pilot symbol. Thus, a frequency detector may be designed to provide a complete frequency error estimate, $\hat{\phi}$, every second pilot symbol period, with the frequency error estimates being alternately derived from the pilot symbol sets of [-A A A-A] and [A-A-A A] by properly manipulating the signs for subtractors 544c and 544d.

Figure 6A:
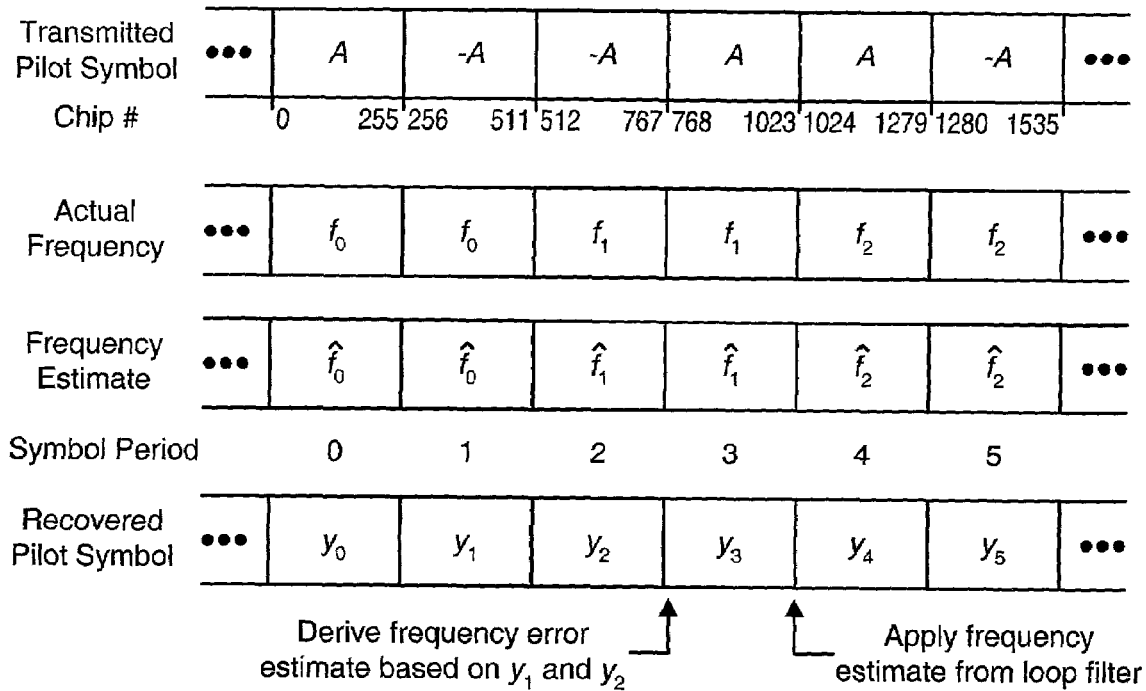
FIGS. 6A and 6B are diagrams of two frequency tracking timelines for the frequency detectors shown in FIGS. 5B and 5C, respectively.

FIG. 6A is a diagram of a frequency tracking timeline for the first frequency detector design. The topmost portion of FIG. 6A shows the pilot symbols transmitted from the second (diversity) antenna, which conforms to the pilot symbol pattern shown in FIG. 2. In the example shown in FIG. 6A, the actual received carrier frequency is assumed to be constant over two pilot symbol periods (which is 512 chips in W-CDMA). This is a reasonable approximation since the maximum rate of change of frequency due to Doppler is typically small (e.g., a few Hz per 512 chips).

FIG. 6A also shows the processing for the first frequency detector design. For this frequency detector, a pilot symbol is recovered for each pilot symbol period. After the even-numbered pilot symbol has been recovered during pilot symbol period 2k+1, the phase difference between the most recent even-numbered and odd-numbered pilot symbols, $y_{2k}$ and $y_{2k-1}$, is determined (e.g., by performing a cross-product of $y_{2k}$ and $y_{2k-1}$, as shown in equation (22)) and provided as the frequency error estimate for this pilot symbol pair. As shown in the timeline, each frequency error estimate is derived from two like-kind recovered pilot symbols (i.e., corresponding to either A A, or -A-A transmitted from the second antenna). The frequency error estimate is then provided to the loop filter and filtered to provide the frequency control, which is indicative of the frequency estimate, $\hat{f}_{2k}$. This frequency estimate may be applied to the rotator at the subsequent pilot symbol period 2k+2. For example, the recovered pilot symbols, $y_1$ and $y_2$, are processed during pilot symbol period k=3 to derive the frequency estimate, $\hat{f}_2$, which is then applied at the subsequent pilot symbol period k=4.

Figure 6B:
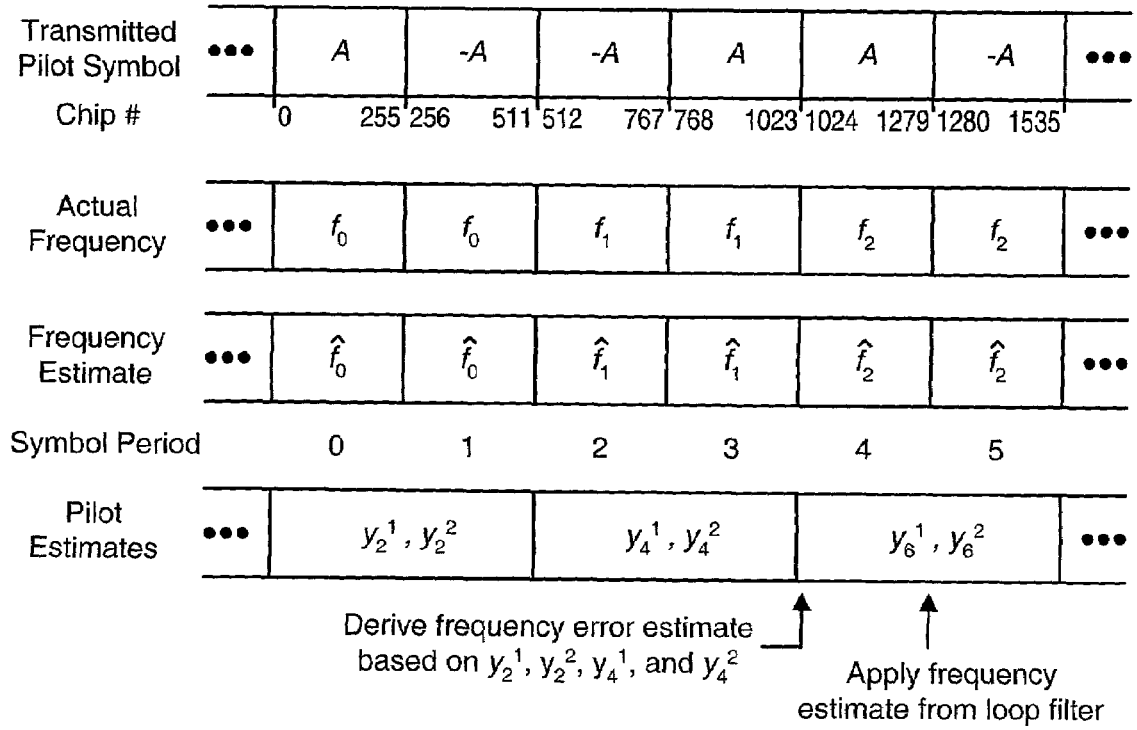

FIG. 6B is a diagram of a frequency tracking timeline for the second frequency detector design. In the example shown in FIG. 6B, the diversity pilot symbol pattern of [A-A-A A] is used and the actual received carrier frequency is also assumed to be constant over two pilot symbol periods.

FIG. 6B also shows the processing for the second frequency detector design. For this frequency detector, a pilot estimate for each base station antenna is derived from each pair of non like-kind recovered pilot symbols. After the odd-numbered pilot symbol, $y_{2k+1}$, have been recovered during pilot symbol period 2k+2, the recovered pilot symbols for the most recent odd-numbered and even-numbered pilot symbol, $y_{2k+1}$ and $y_{2k}$, are combined to derive the pilot estimates for the first and second antennas, as shown above in equations (30) through (33). After all four pilot estimates have been derived for both antennas (e.g., during pilot symbol period 2k+2), the frequency error estimate is derived, e.g., by performing a cross-product as shown in equation (34). The frequency error estimate is then provided to the loop filter and filtered to provide the frequency estimate, $\hat{f}_{2k}$, which may then be applied at the subsequent pilot symbol period 2k+3. For example, the recovered pilot symbols, $y_0$, $y_1$, $y_2$ and $y_3$, are processed during pilot symbol period k=4 to derive the frequency estimate, $\hat{f}_2$, which is then applied at the subsequent pilot symbol period k=5. Similarly, the recovered pilot symbols, $y_2$, $y_3$, $y_4$, and $y_5$ are processed during pilot symbol period k=6 to derive the frequency estimate, $\hat{f}_3$, which is then applied at the subsequent pilot symbol period k=7.

The first and second frequency detector designs described above represent two specific frequency detection schemes. Other frequency detection schemes (or designs) may also be implemented and used, and are within the scope of the invention.

Frequency Tracking Loop

Figure 5E:
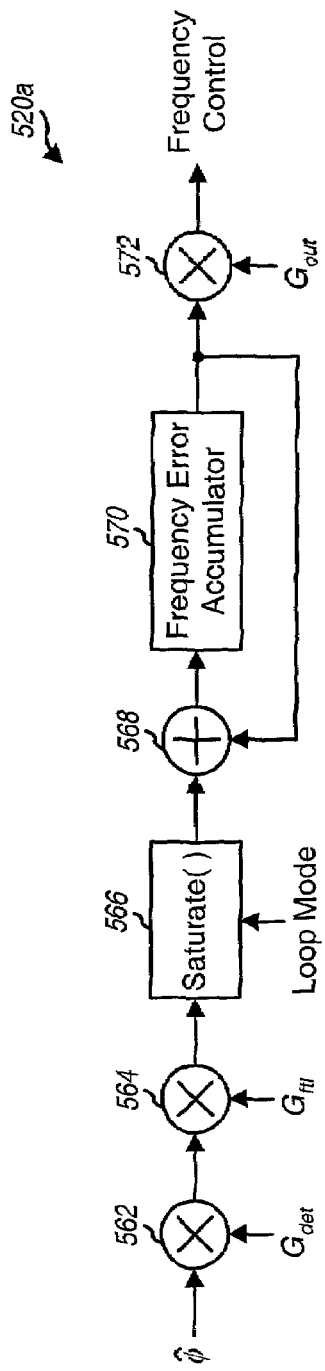
FIG. 5E is a block diagram of an embodiment of a loop filter used to filter the frequency error estimates to provide a frequency control.

FIG. 5E is a block diagram of an embodiment of a loop filter 520a, which may be used to filter the frequency error estimates to provide the frequency control. Loop filter 520a may be used for loop filter 520 in FIG. 5A. In the embodiment shown in FIG. 5E, the frequency error estimates, $\hat{\phi}$, from the preceding frequency detector 510 are initially scaled by a multiplier 562 with a gain, $G_{det}$, that may be dependent on the selected loop mode. The scaled frequency error estimates are further scaled with a loop gain, $G_{ftl}$, by a multiplier 564, and the result is then saturated or limited (e.g., to 17 bits or 20 bits, depending on the selected loop mode) by an element 566. The saturated result is then accumulated by a summer 568 with the current frequency estimate stored in an accumulator 570, and the new frequency estimate from the summer is stored back into the accumulator. The frequency estimate in accumulator 570 is scaled by a multiplier 572 with an output gain, $G_{out}$, to provide the frequency control. Depending on the specific design of the receiver unit, the frequency control may be provided to a digital rotator used to correct for the phase rotation in the data samples due to the frequency error (as shown in FIG. 4), or may be provided to a local oscillator used to generate the complex downconversion signal.

As noted above, the frequency tracking loop may be designed to support a number of loop modes, e.g., the acquisition and tracking modes. In an embodiment, the first frequency detector design shown in FIG. 5B may be used for the acquisition mode, and the second frequency detector design shown in FIG. 5C may be used for the tracking mode. Other frequency detector designs may also be used for each loop mode, and this is also within the scope of the invention.

If the frequency detector shown in FIGS. 5B and 6A is used for the acquisition mode, then the frequency tracking loop in the acquisition mode may be modeled by a system that updates as follows:

$$\hat{f}_k = \hat{f}_{k-1} + G \frac{(f_{k-1} - \hat{f}_{k-1}) + (f_{k-2} - \hat{f}_{k-2})}{2}, \quad \text{Eq (35a)}$$

which, in the z-domain, may be expressed as:

$$\hat{F}(z) = F(z) + \frac{\frac{G}{2}(z^{-1} + z^{-2})}{1 - z^{-1} + \frac{G}{2}(z^{-1} + z^{-2})}. \quad \text{Eq (35b)}$$

Similarly, if the frequency detector shown in FIGS. 5C and 6B is used for the tracking mode, then the frequency tracking loop in the tracking mode may be modeled by a system that updates as follows:

$$\hat{f}_k = \hat{f}_{k-1} + \frac{G(f_{k-2} - \hat{f}_{k-2}) + (f_{k-3} - \hat{f}_{k-3})}{2}, \quad \text{Eq (36a)}$$

which, in the z-domain, may be expressed as:

$$\hat{F}(z) = F(z) + \frac{\frac{G}{2}(z^{-2} + z^{-3})}{1 - z^{-1} + \frac{G}{2}(z^{-2} + z^{-3})}. \quad \text{Eq (36b)}$$

In the above equations, G represents the overall gain of the frequency tracking loop and may be expressed as:

$$G = (\sigma^2 G_{rot}^2) \frac{2E_{c,pilot}}{I_0} N_p^2 \cdot 2\pi N_p T_c G_{det} G_{ftl} G_{out} K_0, \quad \text{Eq (37)}$$

where

σ is the standard deviation of the input chip-rate signal, which is determined by the automatic gain control (AGC) loop setpoint, $G_{rot}$ is the gain of the rotator used to reduce the frequency error, $G_{det}$ is the gain for the frequency error estimates (e.g., $2^{-6}$ in the acquisition mode and $2^{-8}$ in the tracking mode), $G_{ftl}$ is the loop filter gain (e.g., 1024), $G_{out}$ is the loop filter output gain (e.g., $2^{-16}$), $K_0$ is the transfer gain of the rotator (e.g., 7.4 Hz/LSB of the frequency control), $T_c$ is a chip period (e.g., 1/3,840,000 seconds for W-CDMA), $N_p$ is the pilot accumulation interval (e.g., 256 chips for acquisition mode and 512 chips for tracking mode), and $E_{c,pilot}/I_0$ is the received pilot strength (i.e., the pilot power over the total received power).

A time constant, τ, indicative of the response time for the acquisition and tracking modes may be approximated as follows:

$$\tau = \frac{512T_c}{G}. \quad \text{Eq (38)}$$

The standard deviation, $\sigma_{track}$, of the frequency error in the tracking mode may be expressed as:

$$\sigma_{acq} = \sqrt{\frac{G}{2-G}\left(\frac{2(\sigma_p^4 + G\mu_p^2\sigma_p^2)}{(2\pi N_p T_c \mu_p^2)^2}\right)}. \qquad \text{Eq (39)}$$

Similarly, the standard deviation, $\sigma_{acq}$, of the frequency error in the acquisition mode may be expressed as:

$$\sigma_{acq} = \sqrt{\frac{G}{2-G}\left(\frac{2(\sigma_p^4 + \mu_p^2\sigma_p^2)}{(2\pi N_p T_c \mu_p^2)^2}\right)}. \qquad \text{Eq (40)}$$

For the above equations, the mean, $\mu_p$, and the standard deviation, $\sigma_p$, of the recovered pilot symbols may be expressed as:

$$\mu_p = \sigma_{AGC} G_{rot} N_p \sqrt{\frac{2E_{c,pilot}}{I_0}}, \text{ and} \qquad \text{Eq (41)}$$

$$\sigma_p = \sigma_{AGC} G_{rot} \sqrt{N_p} \sqrt{\frac{N_t}{I_0}}, \qquad \text{Eq (42)}$$

where
- $\sigma_{AGC}$ is a standard deviation determined by an automatic gain control (AGC) loop used to set the magnitude of the data samples, and
- $N_t$ is the power spectral density of thermal noise and other non-orthogonal interference in the input signal.

Referring back to FIG. 5E, the gains and other values used for the elements of loop filter 520a may be selected to provide the desired performance. Loop filter 520a may be designed based on various factors such as, for example, the maximum frequency error in the multipath to be acquired (e.g., 5 KHz), the acquisition speed (shorter is typically better), the frequency error tracking range (e.g., 1 KHz), the expected worse case $E_{c,pilot}/I_0$, the mean and standard deviation of the frequency error, and so on. Different values may be used for selected ones of the elements in loop filter 520a for different loop modes, as described below.

Acquisition Mode. The frequency detector gain, $G_{det}$, contributes to the overall loop gain, G, and may be made a function of the loop mode. For the acquisition mode, a wider loop bandwidth is desired for a larger acquisition range and the gain $G_{det}$ can be made larger. For example, the gain for the acquisition mode may be made four times larger than the gain for the tracking mode (e.g., $2^{-6}$ versus $2^{-8}$). The loop gain, $G_{flt}$, also contributes to the overall loop gain, G, but may be set to a particular value (e.g., 1024) for both loop modes. The gains, $G_{det}$ and $G_{flt}$, may also be combined into one gain value.

Saturation element 566 is used to saturate the output from multiplier 564 to a particular maximum value. In an embodiment, this maximum value is dependent on the loop mode. In the acquisition mode, the frequency error to be accumulated by accumulator 570 may be limited to a first maximum value (e.g., $2^{20}$) so that the frequency estimate is not changed by more than a first maximum frequency change (e.g., 120 Hz) for any frequency error estimate interval (e.g., 512 chips). If larger frequency changes (i.e., higher first maximum value) are allowed, then faster acquisition time may be possible, but the larger frequency changes may also result in oscillation in the frequency estimate under certain conditions. Thus the maximum value is selected for fast acquisition time and loop stability under all expected operating conditions.

The frequency tracking loop may be designed to switch from the acquisition mode to the tracking mode after a particular period of time. This time period may be dependent on how long it takes the frequency tracking loop to acquire an initial (e.g., 5 KHz) frequency error and to pull to within a particular offset (e.g., 1 KHz) of the target carrier frequency. This acquisition and pull-in time increases at low $E_{c,pilot}/I_0$.

Tracking Mode. In the tracking mode, the frequency error to be accumulated by accumulator 570 may be limited to a second maximum value (e.g., $2^{17}$) so that the frequency estimate is not changed by a second maximum frequency change (e.g., 40 Hz) for any pilot accumulation interval (e.g., 512 chips).

FIG. 5E shows a specific design for a loop filter. Other designs may also be implemented and are within the scope of the invention. Moreover, fewer or more loop modes may also be supported by the loop filter, and this is also within the scope of the invention.

For clarity, various aspects and embodiments of the frequency tracking have been described for the transmit diversity mode supported by W-CDMA (e.g., the STTD mode). The techniques described herein may also be used for other diversity transmitted signals (e.g., pilots) in other CDMA systems and other wireless communication systems such as, for example, multiple-input multiple-output (MIMO) systems, multiple-input single-output (MISO) systems, and so on.

The frequency tracking techniques described herein may be implemented by various means. For example, the frequency detection and loop filtering may be implemented in hardware, software, or a combination thereof. For a hardware implementation, the elements used for frequency tracking may be implemented within one or more application specific integrated circuits (ASICs), digital signal processors (DSPs), digital signal processing devices (DSPDs), programmable logic devices (PLDs), controllers, micro-controllers, microprocessors, other electronic units designed to perform the functions described herein, or a combination thereof.

For a software implementation, the elements used for frequency tracking may be implemented with modules (e.g., procedures, functions, and so on) that perform the functions described herein. The software codes may be stored in a memory unit (e.g., memory 162 in FIG. 1) and executed by a processor (e.g., controller 160). The memory unit may be implemented within the processor or external to the processor, in which case it can be communicatively coupled to the processor via various means as it known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for performing frequency tracking of a received signal instance, comprising:
   processing the received signal instance to provide recovered pilot symbols, wherein the received signal instance comprises signal components for a plurality of transmitted signals and a respective corresponding plurality of pilots, each of the plurality of pilots generated based on a respective pilot symbol pattern;

deriving estimates of frequency error in downconversion of the received signal instance based on the recovered pilot symbols and in accordance with a plurality of frequency detection schemes; and adjusting the downconversion of the received signal instance based on a frequency control derived from the frequency error estimates.

2. The method of claim 1, wherein data samples are generated for the received signal instance, and wherein the adjusting includes rotating the data samples based on the frequency control to reduce the frequency error.

3. The method of claim 1, wherein the plurality of frequency detection schemes includes a first scheme that provides maximum likelihood estimates of the frequency error.

4. The method of claim 1, wherein the deriving includes performing a cross-product on each pair of recovered pilot symbols corresponding to similar pilot symbols in one of the transmitted signals.

5. The method of claim 1, wherein the plurality of frequency detection schemes includes a second scheme that provides frequency error estimates based on frequency error estimated for each transmitted signal.

6. The method of claim 1, wherein the deriving includes:
estimating the frequency error for each transmitted signal; and
combining estimated frequency errors for the plurality of transmitted signals to derive the frequency error estimates for the received signal path.

7. The method of claim 1, further comprising:
filtering the frequency error estimates based on a particular loop filter to derive the frequency control.

8. The method of claim 7, wherein the loop filter supports a plurality of modes.

9. The method of claim 8, wherein the plurality of modes includes an acquisition mode having a wider loop bandwidth and faster acquisition time.

10. The method of claim 8, wherein the plurality of modes includes a tracking mode having a narrower loop bandwidth and reduced standard deviation for the frequency error estimates.

11. The method of claim 7, wherein the filtering includes:
scaling the frequency error estimates based on a particular scaling factor; and
accumulating the scaled frequency error estimates.

12. The method of claim 11, wherein the loop filter supports a plurality of modes, and wherein each mode is associated with a respective scaling factor.

13. The method of claim 11, wherein the filtering further includes saturating the scaled frequency error estimates to a particular maximum value.

14. The method of claim 13, wherein the loop filter supports a plurality of modes, and wherein each mode is associated with a respective maximum value for the scaled frequency error estimates.

15. The method of claim 1, wherein the communication system is a CDMA communication system.

16. The method of claim 15, wherein the CDMA communication system implements W-CDMA standard.

17. In a CDMA communication system, a method for performing frequency tracking of a received signal instance, comprising:
processing the received signal instance to provide recovered pilot symbols, wherein the received signal instance comprises signal components for a plurality of transmitted signals and a respective corresponding plurality of pilots, each of the plurality of pilots generated based on a respective pilot symbol pattern;

deriving estimates of frequency error in downconversion of the received signal instance based on the recovered pilot symbols and in accordance with a plurality of frequency detection schemes;

filtering the frequency error estimates to derive a frequency control, wherein an acquisition mode and a tracking mode is supported and each mode is associated with a respective frequency detection scheme and a respective set of values for the filtering; and adjusting the downconversion of the received signal instance based on the frequency control.

18. An apparatus comprising:
a digital signal processing device; and
a memory communicatively coupled to the digital signal processing device (DSPD), wherein the DSPD is capable of interpreting digital information to:
direct processing of the received signal instance to provide recovered pilot symbols, wherein the received signal instance comprises signal components for a plurality of transmitted signals and a respective corresponding plurality of pilots, each of the plurality of pilots generated based on a respective pilot symbol pattern;
derive estimates of frequency error in downconversion of the received signal instance based on the recovered pilot symbols and in accordance with a plurality of frequency detection schemes; and
direct the downconversion of the received signal instance based on a frequency control derived from the frequency error estimates.

19. In a wireless communication system, a method for estimating frequency error of a received signal instance, comprising:
processing the received signal instance to provide recovered pilot symbols, wherein the received signal instance comprises signal components for a plurality of transmitted signals and a respective corresponding plurality of pilots, each of the plurality of pilots generated based on a respective pilot symbol pattern, wherein one of a plurality of unique groups of pilot symbols is transmitted for each pilot symbol period, and wherein each unique pilot symbol group includes a pilot symbol of a specific value for each transmitted signal;
deriving an estimate of the frequency error based on a set of recovered pilot symbols corresponding to each unique pilot symbol group; and
combining frequency error estimates derived for the plurality of unique pilot symbol groups to provide a frequency error estimate for the received signal instance.

20. The method of claim 19, wherein the frequency error estimate for the received signal instance is derived based on a maximum likelihood of the frequency error estimate given the sets of recovered pilot symbols for the plurality of unique pilot symbol groups.

21. The method of claim 19, wherein the deriving includes
combining a first set of recovered pilot symbols corresponding to a set of pilot symbols of a first value in a first transmitted signal to provide a first frequency error estimate; and
combining a second set of recovered pilot symbols corresponding to a set of pilot symbols of a second value in the first transmitted signal to provide a second frequency error estimate.

22. The method of claim 19, wherein the deriving includes applying a particular function to each set of recovered pilot symbols for each unique pilot symbol group to derive the frequency error estimate for the group.

23. The method of claim 19, wherein the deriving includes performing a cross-product of a set of two recovered pilot symbols for each unique pilot symbol group to derive the frequency error estimate for the group.

24. The method of claim 19, wherein the pilot symbol patterns for two transmitted signals comprise [A A A A] and [A A -A -A].

25. The method of claim 19, wherein the plurality of unique pilot symbol groups comprise {A A} and {A -A}.

26. The method of claim 19, wherein the wireless communication system implements W-CDMA standard.

27. An apparatus comprising:
a digital signal processing device; and
a memory communicatively coupled to the digital signal processing device (DSPD), wherein the DSPD is capable of interpreting digital information to:
direct processing of the received signal instance to provide recovered pilot symbols, wherein the received signal instance comprises signal components for a plurality of transmitted signals and a respective corresponding plurality of pilots, each of the plurality of pilots generated based on a respective pilot symbol pattern, wherein one of a plurality of unique groups of pilot symbols is transmitted for each pilot symbol period, and wherein each unique pilot symbol group includes a pilot symbol of a specific value for each transmitted signal;
derive estimates of the frequency error based on recovered pilot symbols for each unique pilot symbol group; and
combine the frequency error estimates derived for the plurality of unique pilot symbol groups to provide the frequency error estimate for the received signal instance.

28. A frequency tracking loop in a wireless communication system, comprising:
a frequency detector operative to receive pilot symbols recovered for a received signal instance and to derive estimates of frequency error in downconversion of the received signal instance based on the recovered pilot symbols and in accordance with a plurality of frequency detection schemes, wherein the received signal instance comprises signal components for a plurality of transmitted signals and a respective corresponding plurality of pilots, each of the plurality of pilots generated based on a respective pilot symbol pattern; and
a loop filter operative to receive and filter the frequency error estimates to provide a frequency control for adjusting the downconversion of the received signal instance, wherein the frequency tracking loop supports a plurality of modes and wherein each mode is associated with a respective frequency detection scheme and a respective set of values for the loop filter.

29. An apparatus for tracking frequency in a wireless communication system, comprising:
means for receiving pilot symbols recovered for a received signal instance and for deriving estimates of frequency error in downconversion of the received signal instance based on the recovered pilot symbols and in accordance with a plurality of frequency detection schemes, wherein the received signal instance comprises signal components for a plurality of transmitted signals and a respective corresponding plurality of pilots, each of the plurality of pilots generated based on a respective pilot symbol pattern; and
means for filtering the frequency error estimates to provide a frequency control for adjusting the downconversion of the received signal instance, wherein the apparatus supports a plurality of modes and each mode is associated with a respective frequency detection scheme and a respective set of values for the filtering.

30. A frequency tracking loop in a CDMA communication system, comprising:
a frequency detector operative to receive pilot symbols recovered for a received signal instance and to derive maximum likelihood estimates of frequency error in downconversion of the received signal instance based on the recovered pilot symbols, wherein the received signal instance comprises signal components for a plurality of transmitted signals and a respective corresponding plurality of pilots, each of the plurality of pilots generated based on a respective pilot symbol pattern; and
a loop filter operative to receive and filter the frequency error estimates to provide a frequency control for adjusting the downconversion of the received signal instance.

* * * * *